US011351939B2

(12) United States Patent
Gourari et al.

(10) Patent No.: US 11,351,939 B2
(45) Date of Patent: Jun. 7, 2022

(54) REDUNDANT ETHERNET NETWORK AND SENSOR PROCESSING SYSTEM FOR VEHICLES AND RELATED METHODS

(71) Applicant: NEUTRON AUTOMOTIVE CONTROLS INC., Ottawa (CA)

(72) Inventors: Alexandre Gourari, Toronto (CA); John Joseph Wojtkowicz, Yarker (CA)

(73) Assignee: Neutron Automotive Controls Inc., Ottawa (CA)

( * ) Notice: Subject to any disclaimer, the term of this patent is extended or adjusted under 35 U.S.C. 154(b) by 0 days.

(21) Appl. No.: 17/279,593

(22) PCT Filed: Oct. 7, 2020

(86) PCT No.: PCT/CA2020/051345
§ 371 (c)(1),
(2) Date: Mar. 25, 2021

(87) PCT Pub. No.: WO2021/068067
PCT Pub. Date: Apr. 15, 2021

(65) Prior Publication Data
US 2021/0309167 A1    Oct. 7, 2021

Related U.S. Application Data

(60) Provisional application No. 62/912,203, filed on Oct. 8, 2019.

(30) Foreign Application Priority Data

Oct. 8, 2019    (CA) .................................. CA 3057937

(51) Int. Cl.
*B60R 16/023*    (2006.01)
*G06K 9/62*    (2022.01)
(Continued)

(52) U.S. Cl.
CPC .......... *B60R 16/023* (2013.01); *G06K 9/6288* (2013.01); *G06V 20/56* (2022.01);
(Continued)

(58) Field of Classification Search
CPC ........ B60R 16/023; H04L 12/42; H04L 12/44
See application file for complete search history.

(56) References Cited

U.S. PATENT DOCUMENTS

| 9,868,446 B1 | 1/2018 | Zhu et al. | |
| 2019/0312928 A1* | 10/2019 | D'Ercoli | .............. H04L 9/0869 |
| 2020/0125858 A1* | 4/2020 | Bauer | ................... H04L 12/422 |

FOREIGN PATENT DOCUMENTS

WO    2017/045141 A1    3/2017

OTHER PUBLICATIONS

International Search Report issued in corresponding PCT Application No. PCT/CA2020/051345; Search completed Dec. 9, 2020.
(Continued)

*Primary Examiner* — Benyam Haile
(74) *Attorney, Agent, or Firm* — Wilfred P. So

(57)    ABSTRACT

Reliability and responsiveness in vehicles are becoming more important as semi-automation and automation are becoming more prevalent. A redundant Ethernet network system is provided within a vehicle and includes a first node connected to a first sensor and a second node connected to a second sensor. A first Ethernet cable is connected between the first node and the second node, a second Ethernet cable is connected between the first node and an electronic control unit (ECU), and a third Ethernet cable connected between the second node and the ECU. Data from the first sensor and the second sensor is transmitted across the Ethernet network to reach the ECU. Data from these sensors is also compared
(Continued)

and processed locally at the first node and the second node to improve reliability and to reduce processing load on the ECU.

36 Claims, 11 Drawing Sheets

(51) Int. Cl.
G08B 21/18 (2006.01)
H04L 12/437 (2006.01)
G06V 20/56 (2022.01)
G01S 13/86 (2006.01)
G01S 13/931 (2020.01)
H04L 12/44 (2006.01)

(52) U.S. Cl.
CPC ............ *G08B 21/18* (2013.01); *H04L 12/437* (2013.01); *G01S 13/867* (2013.01); *G01S 13/931* (2013.01); *H04L 12/44* (2013.01)

(56) References Cited

OTHER PUBLICATIONS

Amir Bar-Niv; "The Inevitable—High Speed Ethernet in Automotive"; 2018 IEEE Ethernet & IP @ Automotive Technology Day; Oct. 9-10, 2018.

Olaf Krieger and Christopher Mash; "1000BASE-T1 from Standard to Series Production—Enabling Next Generation Scalable Architecture"; 2018 IEEE Ethernet & IP @ Automotive Technology Day; Oct. 9-10, 2018.

Martin Miller; "10 Mbps Single Pair Ethernet (10SPE 10 BASE T1S)"; 2018 IEEE Ethernet & IP @ Automotive Technology Day; Oct. 9-10, 2018.

"High-availability Seamless Redundancy (HSR)"; Flexibilis website; https://www.flexibilis.com/technology/high-availability-seamless-redundancy-hsr/; accessed at least on Sep. 23, 2019.

\* cited by examiner

[x] = pointer to [A] or [B], and [N1-analysis] if o/c/b locally validated; or
[x'] = pointers to both [A] [B], and [N1-analysis] if o/c/b not locally validated

[y] = pointer to [A] or [B], and [N2-analysis] if o/c/b locally validated; or
[y'] = pointers to both [A] [B], and [N2-analysis] if o/c/b not locally validated

[x] = pointer to [A] or [B], and [N1-analysis] if o/c/b locally validated; or
[x'] = pointers to both [A] [B], and [N1-analysis] if o/c/b not locally validated

[y] = pointer to [A] or [B], and [N2-analysis] if object locally validated; or
[y'] = pointers to both [A] [B], and [N2-analysis] if o/c/b not locally validated @ earlier time period @ later time period

[x] = pointer to [A] or [B], and [N1-analysis] if target locally validated; or
[x'] = pointers to both [A] [B], and [N1-analysis] if target not locally validated

[y] = pointer to [A] or [B], and [N2-analysis] if target locally validated; or
[y'] = pointers to both [A] [B], and [N2-analysis] if target not locally validated

[x] = pointer to [A] or [B], and [N1-analysis] if target locally validated; or
[x'] = pointers to both [A] [B], and [N1-analysis] if target not locally validated

[y] = pointer to [A] or [B], and [N2-analysis] if target locally validated; or
[y'] = pointers to both [A] [B], and [N2-analysis] if target not locally validated

REDUNDANT ETHERNET NETWORK AND SENSOR PROCESSING SYSTEM FOR VEHICLES AND RELATED METHODS

CROSS-REFERENCE TO RELATED APPLICATIONS

This patent application claims priority to U.S. Patent Application No. 62/912,203 filed on Oct. 8, 2019 and titled "Redundant Ethernet Network And Sensor Processing System For Vehicles And Related Methods", and to Canadian Patent Application No. 3,057,937 filed on Oct. 8, 2019 and titled "Redundant Ethernet Network And Sensor Processing System For Vehicles And Related Methods", the entire contents of which are herein incorporated by reference.

TECHNICAL FIELD

The following generally relates to a redundant Ethernet network and sensor processing system for vehicles and related methods.

DESCRIPTION OF THE RELATED ART

Vehicles, such as cars, are becoming more digital in the collection of data and the control of the vehicle. This leads to semi-autonomous or fully autonomous vehicles, including, but not limited to, Advanced Driver Assistance Systems (ADAS) as well as self-driving cars. Vehicles are beginning to include more sensors, such as cameras, radar, sonar and lidar. The collected data is transmitted via an Ethernet wire to a processor that is on board the vehicle, and then is used to initiate an action (e.g. control a motor, control an actuator, provide an audio or visual alert, etc.). The speed of transmitting and reliability of this process helps the vehicle become more responsive and safer. Disruption in the transmission of data, or in the processing of the data, would hinder the vehicle's responsiveness and decrease the vehicle's safety.

BRIEF DESCRIPTION OF THE DRAWINGS

Embodiments will now be described by way of example only with reference to the appended drawings wherein.

DETAILED DESCRIPTION

Figure 1:
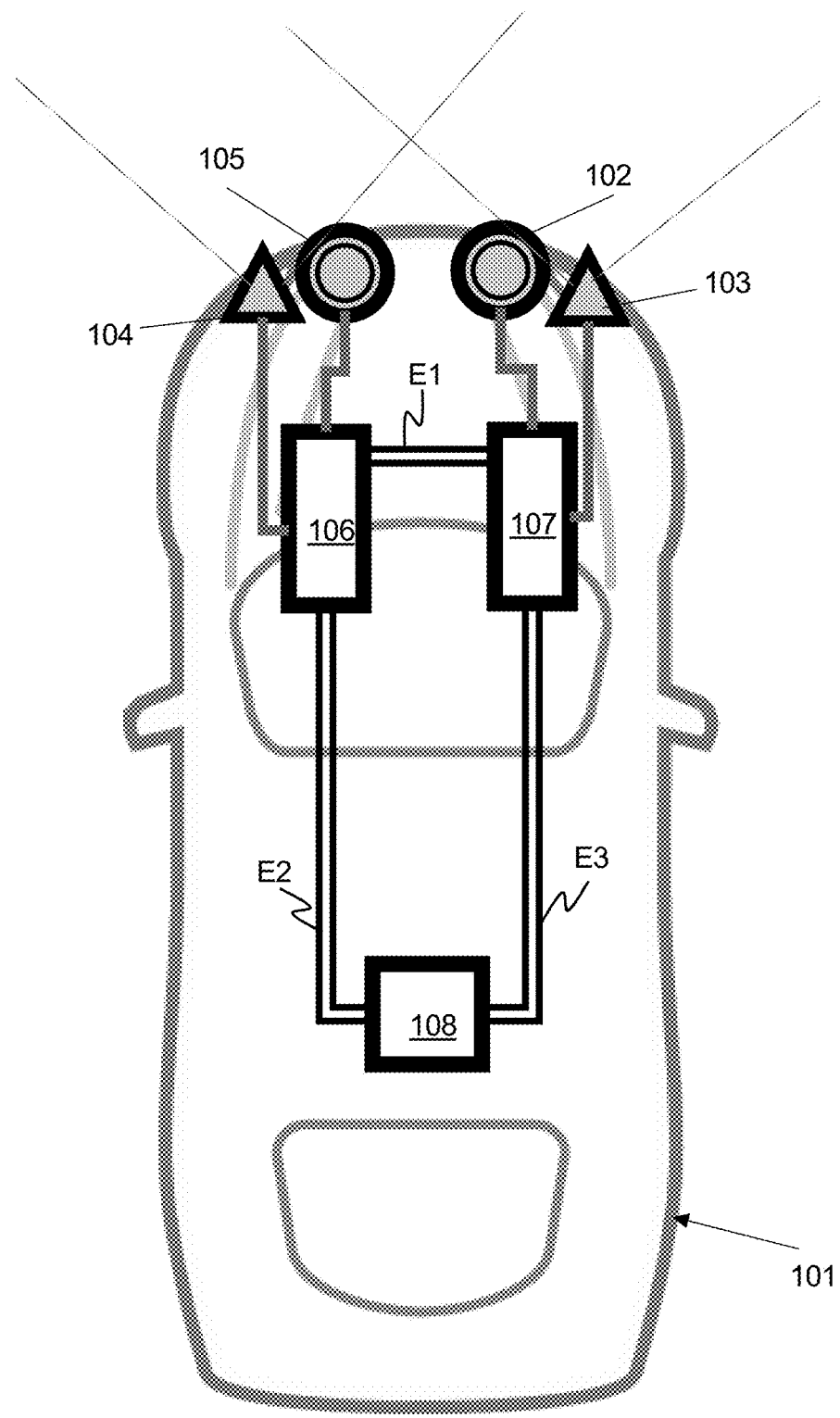
FIG. 1 is a schematic diagram of a car that includes sensors that connected to a built-in redundant Ethernet network and sensor processing (RENASP) system, according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Vehicles, including, but not limited to cars, are equipped with one or more central processor units (CPUs) that control the operations of the vehicle. In some other example, there are multiple subsystems of a car, and each subsystem has at least one processor, also called an Electronic Control Unit (ECU). For example, there is an ECU for engine control subsystem; there is another ECU for a powertrain control subsystem; there is another ECU for a brake control subsystem; there is another ECU for a suspension control subsystem; there is another ECU for an electric power steering control subsystem; and so forth. In each subsystem, there may be multiple sensors and multiple processes to be executed by the corresponding dedicated ECU. In an alternative example embodiment, there is one central ECU that controls all the subsystems. It is herein recognized that as more sensors are integrated into a given subsystem, and that as the computations become more complex, the processing on the corresponding dedicated ECU becomes more resource intensive. In particular, more processing power, more memory resources, and faster data connection speeds are required.

Furthermore, it is herein recognized that the reliability of these subsystems are often critical to the functionality of the vehicle and the safety of the vehicle. For example, if sensor data or processed data, or both, is lost in the vehicle's data network (e.g. due to a damaged data cable, a loose data cable connection, a damaged data node, etc.), then the vehicle's functionality and safety could be compromised.

For example, a car includes a radar or a camera, or both, and these sensors capture data regarding an object that is in close proximity to the car. For example, the object is a pedestrian or another car. This data is to be transmitted from a sensor node to an ECU via an Ethernet cable. However, if the Ethernet cable is damaged, or an Ethernet connection is loosened or damaged, or if processing is delayed due to overload or processing requests at the ECU, then the sensor data cannot be processed quickly enough for the car to react to the object. In particular, the sensor data needs to be processed quickly enough so that the car's ADAS can adjust the car's steering or apply braking, or both. Failure or compromise to process the data within the required time limit could lead to the car hitting the object and causing an accident.

Therefore, a redundant Ethernet network and sensor processing (RENASP) system is herein provided. In an example aspect, the RENASP system provides redundancy in data transmission. In another example aspect, the RENASP system provides redundancy in processing sensor data. In another example aspect, the RENASP system reduces the processing load on an ECU. In another example aspect, if a breakage or failure occurs at a node or in the network connect, the RENASP system continues to transmits data to the destination node with zero packet data loss. In another example aspect, if a breakage or failure occurs at a node or in the network connect, the RENASP system continues to transmits data to the destination node without any delay (e.g. zero second delay).

Turning to FIG. 1, a car 101 is shown that is equipped with sensors. For example, a camera 104 and a radar 105 are located on left side of the car, and another camera 103 and another radar 102 are located on the right side of the car. The sensors 104 and 105 are connected to a first node 106, and the sensors 102 and 103 are connected to a second node 107. The data from these sensors are transmitted by Ethernet to an ECU node 108 for processing. To provide redundancy, a network of Ethernet cables is established by connecting the first node 106 and the second node 107 by a first Ethernet cable E1; connecting the first node 106 to the ECU node 108 by a second Ethernet cable E2; and connecting the second node 107 to the ECU node by a third Ethernet cable E3. This configuration is an example of a ring network. Other network configurations that facilitate data transmission redundancy are applicable to the principles described herein, including a mesh network and an interconnected network.

It will also be appreciated that there may be intermediate nodes (not shown) in the Ethernet network. For example, these intermediate nodes include one or more of: a communication node, a control node, another sensor node, a functional node, an Ethernet switch box, and an Ethernet redundancy box. It will also be appreciated that, while the example shown includes two main nodes 106 and 107 for collecting sensor data, there may be additional nodes for collecting sensor data connected into the same Ethernet network. An Ethernet network with more components can use the principles described using the example shown in FIG. 1.

It will be appreciated that the examples shown herein in relate to a car, but these systems and processes can also be applied to other mobile platforms. In other example embodiments, the systems and features described herein apply to other types of mobile platforms like trucks, buses, microbuses, vans, utility vehicles, motorcycles, tractors, agriculture machinery, tanks, construction machinery (e.g. bulldozers, forklifts, ploughs, etc.), aircraft, marine crafts (e.g. boats, submarines, etc.), drones, spacecraft, satellites, robotic vehicles, mobile robots, material handling robots, and trains. The mobile platforms, for example are electric vehicles. In another example, the vehicles are hybrid vehicles. In another example, the vehicles use a combustion engine as the primary motive power.

Figure 2:
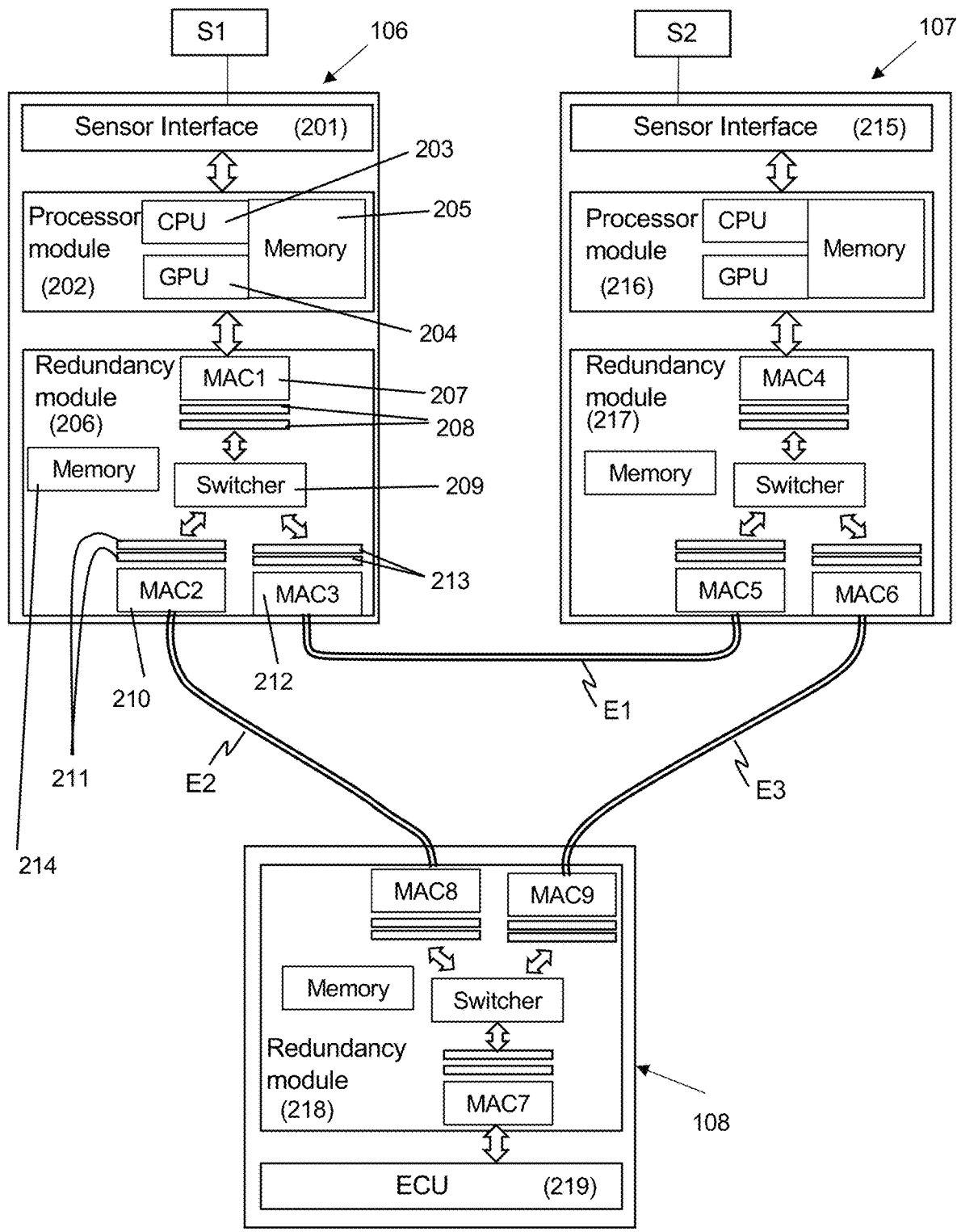
FIG. 2 is a schematic diagram of the RENASP system from FIG. 1, but shown in isolation, according to an example embodiment.

Turning to FIG. 2, another view is shown for the RENASP system, including the first node 106, the second node 107 and the ECU node 108. More generically, a first sensor S1 is connected to the first node 106 and a second sensor S2 is connected to the second node 107. The example configuration shown in FIG. 2 can, for example, implement a high-availability seamless redundancy (HSR) Ethernet protocol. It will be appreciated that different redundant protocols and configurations can be used with the devices and systems described herein.

Although one sensor is shown connected to each of these nodes, it will be appreciated that more than one sensor can interface with each given node. Furthermore, whilst the example in FIG. 1 showed a camera and a radar connected to a same given node, other sensors can be used in addition or in alternative, including and not limited to: temperature sensors, position sensors, voltage sensors, current sensors, Hall effect sensors in a brushless direct current motor, lidar, sonar, magnetometers, and pressure sensors. In an example aspect, a suite of sensors (e.g. a group of two or more different sensors) is connected to each node 106 and 107.

In an example embodiment, the sensors S1 and S2 are of the same type and measure partially or fully overlapping areas or components in or around the car. In the RENASP system, the first node 106 and the second node 107 each locally compares and validates the data from S1 and S2. For example, each of the first node 106 and the second node 107 each validate whether an object (e.g. a target) is identifiable in both sets of data from S1 and S2.

In an alternative example embodiment, the sensors S1 and S2 are of different types and measure partially or fully overlapping areas or components in or around the car. In the RENASP system, the first node 106 and the second node 107 each locally compares and validates the data from S1 and S2. For example, each of the first node and the second node each validate whether an object (e.g. a target) is identifiable in both sets of data from S1 and S2.

In an alternative example embodiment, the sensors S1 and S2 measure areas around the car that partially or fully overlap each other and the portions that overlap are called the overlapping area. The first node and the second node each locally compares data from S1 and S2 to determine if all the multiple objects identified in the S1 data in the overlapping area are also identified in the S2 data in the overlapping area. If so, the data from S1 and S2 are validated. However, if one of the identified objects in one of the S1 data and the S2 data is not identified in the other one of the S1 data and the S2 data, then the S1 data and the S2 data are not validated by the first node or the second node, or both. For example, a first node identifies a child, a bush and a bicycle in the data from S1 in the overlapping area. The first node identifies a child and a bush in the data from S2 in the overlapping area. The identified objects do not match and therefore the data from S1 and S2 do not validate each other. It will be appreciated that objects identified in an area outside the overlapping area is not used in the validation process.

In another alternative example embodiment, the sensors S1 and S2 are of the same type and measure different areas in or around the car. In the RENASP system, the first node 106 and the second node 107 each locally compares data from S1 and S2 to determine whether action is required.

In an example aspect, the sensors S1 and S2 detect the same object or the same environmental parameter (e.g. rain, cloud, snow, dust, terrain, vegetation, a crowd of people, fence, etc.) that spans the different measured or sensed areas simultaneously.

In another example aspect, the sensors S1 and S2 detect the same object moves from one measured or sensed area (e.g. at an initial time) to another measured or sensed area (e.g. at a subsequent time).

In another alternative example embodiment, the sensors S1 and S2 are of different types and measure different areas in and around the car. In the RENASP system, the first node 106 and the second node 107 each locally compares data from S1 and S2 to determine whether action is required.

The first node 106 includes a sensor interface 201, a processor module 202, and a redundancy module 206. The sensor interface 201 receives data from the first sensor S1, and this sensor data is processed by processor module 202 to generate an output. The output from the processor module 202 is obtained by the redundancy module 206, and the redundancy module 206 transmits the output to other nodes in the RENSAP. In this example, the redundancy module 206 transmits the output to the second node 107 and the ECU node 108. In an example aspect, two instances of the output are created by the first node 106, and one instance of the output is transmitted in a first direction via the data port 210 of the redundancy module and a second instance of the output is transmitted in a second direction via the data port 212 of the redundancy module. In an example aspect, both instances of the output are transmitted at the same time in different direction via the ports 210 and 212.

In an example implementation, the first node 106 includes a housing that houses the components 201, 202, 206 therein. In another example aspect, the components 201, 202, 206 are integrated onto one electronic board.

In an example aspect, the processor module 202 includes a central processing unit (CPU) 203, a graphics processing unit (GPU) 204 and memory 205. The GPU 204 is used to process data from S1 in parallel threads. For example, the data is image data from a camera, positioning data from radar, point cloud data from lidar, or a combination thereof where a number of sensors are attached to the sensor interface 201; this data is processed by the GPU. The CPU 203 coordinates the processes of the GPU 204, manages data storage in memory 205 and outputs resulting data. In an example aspect, a neural network model is stored in memory 205 and is executed by the GPU 204 to process the sensor data from S1. In another example aspect, a validation model is stored in memory 205 and is executed at least by the CPU 203 to determine if data from S1 and data from S2 (obtained by the second node 107) validate each other. In further example aspect, the validation model is executed by both the CPU 203 and the GPU 204.

The CPU and GPU are an example. Other processing components can be used, including digital signal processor (DSP), a microcontroller, and a field programmable gate array (FPGA), or a combination thereof. The processing components, for example, are selected to suit the type of sensor data and the type of executable processes used to process the sensor data.

In an example implementation, the processing module 202 includes an image processing module and a comparator module that are integrated into a processing chip, such as, but not limited to, a CPU. It is therefore appreciated that, in other example embodiments, the processing architecture does not include a GPU.

In an example aspect, the redundancy module 206 includes an internal three-port Ethernet switch. In particular, a first port 207 has a first media access control (MAC) unit, a second port 210 has a second MAC unit, and a third port 212 has a third MAC unit. The second port 210 and the third port 212 are external interfacing ports connected to external nodes, and first port 207 is a host port connected to the processor module 202. Associated with each port is a memory buffer system. For example, the first port 207 has a buffer system 208; the second port 210 has its own buffer system 211; and the third port 212 has its own buffer system 213. A switcher module 209 transfers data between the different ports 207, 210, 212.

In a further example aspect, the redundancy module 206 also includes its own memory 214 that stores data that has been transmitted and received at the redundancy module. This data is used to by the redundancy module to determine if received data has been duplicated (e.g. received before) and, if so, discards the duplicate data.

Other currently known and future known three-port Ethernet switches can be incorporated into the redundancy module 206.

In the example shown, the third port 212 is connected to the first Ethernet cable E1 and the second port 210 is connected to the second Ethernet cable E2.

The second node 107 also includes a sensor interface 215, a processor module 216, and a redundancy module 217. In an example aspect, these components 215, 216 and 217 have similar sub-components and operate in a similar manner as the sensor interface 201, processor module 202 and the redundancy module 206 in the first node 105. It will be appreciated that the ports on the redundancy module 217 have their own MAC addresses.

The ECU node 108 includes a redundancy module 218 and an ECU 219. Although not shown, the ECU 219 is in data communication with one or more subsystems of the vehicle.

In an example embodiment, using the system shown in FIGS. 2, S1 and S2 are sensors that sense areas around the vehicle or in the vehicle. In an example aspect, the sensed areas from S1 and S2 partially overlap or fully overlap each other. In another example aspect, the sensed areas S1 and S2 are separated from each and do not overlap each other. The sensor data from S1 is obtained by the first node 106 at the sensor interface 201. The processor module 202 obtains the data from the first sensor S1, processes the same, and outputs sensor data [A] that is time stamped. This sensor data [A] is transmitted to neighboring nodes, such as to the second node 107 via the Ethernet cable E1 and to the ECU 108 via the Ethernet cable E2. In an example aspect, the sensor data [A] is duplicated, and one instance of the sensor data [A] is transmitted via E1 and a second instance of the sensor data [A] is transmitted via E2 at the same time.

The sensor data from S2 is obtained by the second node 107 at the sensor interface 215. The processor module 216 obtains the data from the second sensor S2, processes the same, and outputs sensor data [B] that is time stamped. This sensor data [B] is transmitted to neighboring nodes, such as to the first node 106 via the Ethernet cable E1 and to the ECU 108 via the Ethernet cable E3. In an example aspect, the sensor data [B] is duplicated, and one instance of the sensor data [B] is transmitted via E1 and a second instance of the sensor data [B] is transmitted via E3 at the same time.

In an example embodiment, the data [A] and [B] is multicast across the network, where the first node 106, the second node 107 and the ECU node 108 subscribe to a same multicast address. In an alternative embodiment, the data transmitted by each node is unicast to specific destination MAC addresses.

The redundancy module 206 receives the sensor data [B] from the second node 107 via E1. In addition, after the ECU node 108 receives [B] from the second node via E3, then the ECU node 108 transmits [B] to the first node 106 via E2. In other words, in a nominal condition, the first node 106 receives an instance of the sensor data [B] from the second node 107 via E1, and receives another instance of the same sensor data [B] from the ECU node 108 via E2. The later received copy of [B] is discarded by the redundancy module 206. This provides redundancy and, as will be later discussed, facilitates zero packet data loss in the event of a failure or breakage.

After the first node 106 receives [B], the processor module 202 executes an analysis of both the received data [B] with the locally generated and stored data [A], and outputs analysis data [N1-analysis] to the neighboring nodes. In particular, the processor module 202 compares [A] and [B] to determine if the same attributes are detected and, if so, only one of the data sets [A] and [B] is transmitted to the ECU node 108 along with the [N1-analysis]. For example, the data sets [A] and [B] are images captured by camera sensors with overlapping fields of view, and the processor module 202 executes machine vision processes to each of the data sets [A] and [B] to determine if a same object has been identified in both [A] and [B]. If so, the data sets [A] and [B] are considered validated. In another example, the data sets [A] and [B] are images captured by camera sensors with non-overlapping fields of view, and the processor module 202 executes machine vision processes to each of the data sets [A] and [B] to determine if a same object has been identified in both [A] and [B]. For example, the object has moved from one camera field-of-view to another camera field-of-view, as predicted and expected based on the object's positions and direction of movement. If so, the data sets [A] and [B] are validated. It will be appreciated that different comparisons and processing computations of the data sets [A] and [B] can be executed to determine whether the data sets [A] and [B] are validated.

After validating the data sets [A] and [B], the processor module then outputs a [x], which includes one of [A] and [B] and data that identifies the object in the image. For example, the data that identifies the object in the image includes one or more of: a boundary box around the object, an outline of the object, a size of the object, a distance between the object and the vehicle, a color of the object, and a name of the object (e.g. a fire hydrant, a person, a bicycle, a dog, a cat, a bird, a car, a truck, a curb, a traffic sign, a post, a tree, etc.). The data [x] is then transmitted via the RENASP for processing by the ECU node 108.

Conversely, the second node 107 receives [A] data. In a nominal condition, one copy of [A] is received by the second node via E1 and a second copy of [A] is received via the route E2 and E3. The later received copy of [A] is discarded by the redundancy module 217. After the second node 107 receives [A], the processor module 216 executes an analysis of both the received data [A] with the locally generated and stored data [B], and outputs analysis data [N2-analysis] to the neighboring nodes. In particular, the processor module 216 compares [B] and [A] to determine if the same attributes are detected and, if so, only one of the data sets [A] and [B] is transmitted to the ECU node 108 along with the [N2-analysis]. For example, the data sets [A] and [B] are images captured by camera sensors with overlapping fields of view, and the processor module 216 execute machine vision processes to each of the data sets [A] and [B] to determine if a same object has been identified in both [A] and [B]. This same process is executed at the first node. If so, the data sets [A] and [B] are considered validated. The processor module then outputs a [y], which includes one of [A] and [B] and data that identifies the object in the image. The data [y] is then transmitted via the RENASP for processing by the ECU node 108.

The ECU node 108 receives [x] or [y], or both, and then processes the same in relation to other data (e.g. the speed and direction of the mobile platform, steering inputs into the mobile platform, engine parameters, additional external sensory data, etc.) to determine one or more outputs to control the mobile platform.

The above example in relation to object detection also applies to detecting environmental conditions. For example, the sensors in addition, or in alternative, detect environmental conditions, such as rain, fog, clouds, snow, dust, terrain, vegetation, a crowd of people, fence, etc., and this is reflected in the sensor data [A] and [B]. The nodes compare the data from the different data sets for validation. For example, a given node determines if both sensors S1 and S2 detect a snow condition, or a fog condition, or the same terrain condition, or some other environmental condition.

It will be appreciated that the RENASP serves to reduce the processing load from the ECU 219, as the first node and the second node both take on processing (e.g. data validation and object identification). Furthermore, the RENASP system reduces processing and transmission load over the Ethernet cables by determining which of the redundant data can be discarded after being validated. In another aspect, the RENASP system provides redundancy in processing, as the validation and object identification processes occur in both the first node 106 and the second node 107. For example, if the processing of two data sets [A] and [B] is unable to take place at the first node 106 within a certain time limit, the second node 107 still processes the data to output [y]. In other words, the processing executed locally at the first node and the second node increases the reliability and time responsiveness of the overall RENASP system even if the processing at one of these first and second nodes is unable to execute an analysis of both data sets [A] and [B] in the required time limit.

In another aspect, the RENASP system provides redundancy in data transmission, so that failure or damage to any one of the Ethernet cables E1, E2 or E3 does not affect the processing of data in the RENASP system. For example, if E1 is damaged, then data is transmitted to the destination node via the ECU node 108. The RENASP system uses the duplication of data and the simultaneous transmission of the duplication of data in different directions in the Ethernet network to provides zero packet data loss and zero-second delay in the event one of the Ethernet cables in the network fails, or if an intermediate node fails.

In another aspect, the validation process that is executed locally at the first node 106 and the second node 107 is used by the RENASP to provide confirmation of a nominal condition of the sensors S1 and S2 and the processing of the data. For example, if the sensors S1 and S2 have high percentage of overlapping sensor areas, then whenever an object is detected, the first node should validate the data [A] and [B] and identify the object, and the second node should also validate the data [A] and [B] and identify the same object. However, if the first node, the second node, the ECU node, or a combination thereof, detect a threshold number of invalid conditions (e.g. where [A] and [B] are significantly different) or inconsistencies (e.g. the identified object for the first node and the identified object from the second node, using the same data, are different), or both, then the RENASP system is able to identify an error condition related to the sensors, or to the processing, or both.

Figure 3:
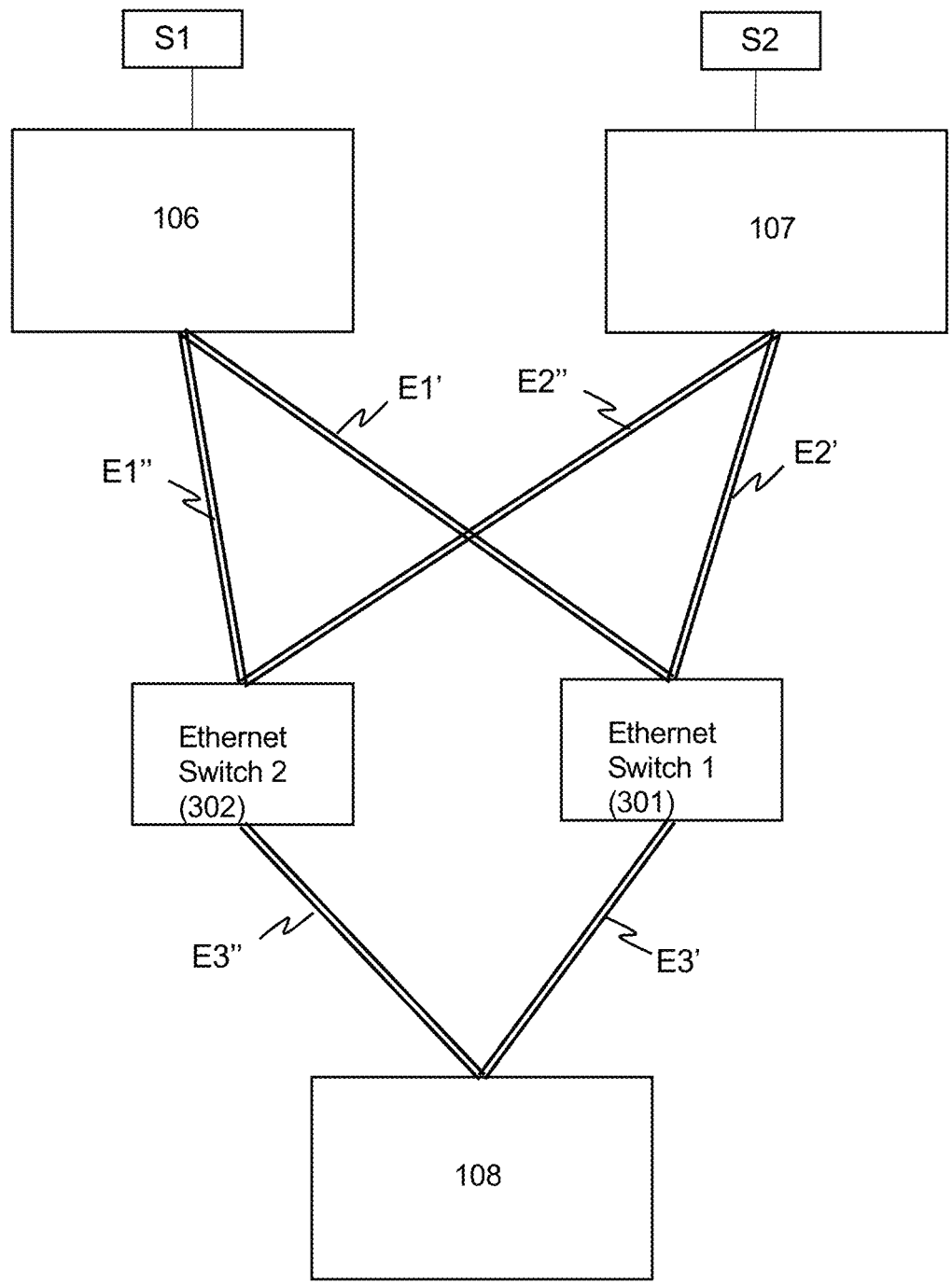
FIG. 3 is a schematic diagram of an alternative architecture of a RENASP system, shown in isolation, according to an example embodiment.

Turning to FIG. 3, another RENASP architecture is shown that uses a parallel redundancy protocol (PRP). In PRP, there are two or more independent active paths between two nodes, and data is independently and simultaneously sent along the two or more active paths. In an example embodiment with two independent active paths, the recipient node uses only the first received data set and discards the second received data set. If only one data set is received, then the recipient node detects that there is an error on the other path.

In the particular example shown in FIG. 3, the first node 106 is connected to a first Ethernet switch 301 via Ethernet cable E1' and a second Ethernet switch 302 via E1". The second node 107 is connected to the first Ethernet switch 301 via Ethernet cable E2' and the second Ethernet switch 302 via E2". The ECU node 108 is connected to the first Ethernet switch 301 via Ethernet cable E3' and a second Ethernet switch 302 via E3".

Using the PRP protocol, data can be transmitted from one node to another node at least along two independent paths. Even in the failure of one of the first and the second Ethernet switches 301 and 302, the remaining one of the Ethernet switches transmits data between the nodes. It will be appreciated that the example operations described in FIG. 2 also apply to the RENASP configuration shown in FIG. 3.

Figure 4:
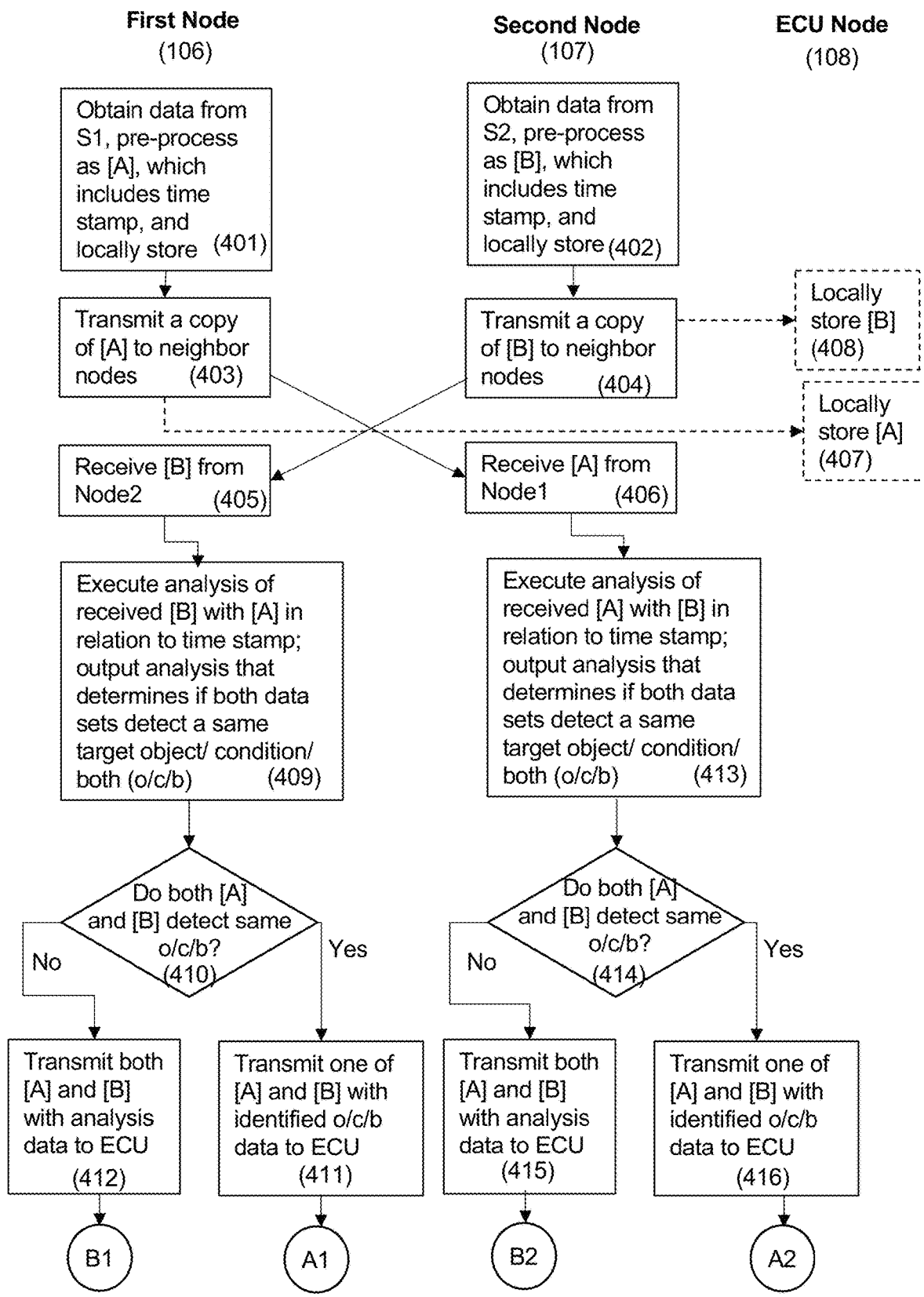
FIG. 4 is a flow diagram of processor executable instructions for transmitting and processing sensor data in the RENASP system, according to an example embodiment.

Turning to FIG. 4, example processor executable instructions are provided for operating the RENASP system in a nominal condition.

At block 401, the first node 106 obtains data from the first sensor S1 and pre-processes the same to output [A], which includes a time stamp. This data [A] is stored in local memory 205 for a given time range for trend and pattern analysis. In other words, local memory 205 stores a time series of sensor data [A].

At the same time at block 402, the second node 107 obtains data from the second sensor S2 and pre-processes the same to output [B], which includes a time stamp. Similar to the first node, the second node's processor module 216 stores this data [B] in its local memory for a given time range for trend and pattern analysis. It will be appreciated that the data [B] having different time stamps is stored in local memory, which in aggregate form a time series of sensor data [B].

At blocks 403 and 404 respectively, the first node transmits a copy of [A] to neighbor nodes, and the second node transmits a copy of [B] to neighbor nodes.

Following block 403, the second node receives [A] from the first node (block 406). Optionally, if the ECU node 108 receives [A] from the first node, the ECU node locally stores [A] (block 407).

Following block 404, the first node receives [B] from the second node (block 405). Optionally, if the ECU node 108 receives [B] from the second node, the ECU node locally stores [B] (block 408).

After receiving the data [B] at the first node (405), the first node executes analysis of received [B] with [A] in relation to the time stamp of [B] (409). In an example aspect, the first node receives a continuous and real-time stream of [A] data that is obtained from the first sensor S1. This data is stored in local memory and includes [A] data with time stamps at t=1 and t=2, for example. The received [B] data may not be continuous and has a time stamp of t=2. At a later time (e.g. t=3), the first node receives the [B] data having the time stamp of t=2. The first node then processes the received [B] data (having time stamp t=2) against a series of [A] data that is before, during and after the time stamp t=2. In other words, data of [A] at t=1, data of [A] at t=2, and data of [A] at t=3 is compared against the data [B] at t=2. The processing of this data, for example, results in an analysis score which defines in whole, or in part, the data [N1-analysis]. For example, this score is used to indicate a particular situation.

In an example aspect, the analysis includes determine whether or not [B] and [A], for the same time period validate each other. Furthermore, the analysis may include identifying an object or a condition (or both), in [A] and in [B], determining whether the object or the condition (or both) is the same, and if so, outputting a validation of the identified object or condition (or both). The analysis also includes, in another example aspect, identifying attributes of the object or the condition (or both) for example, using pattern recognition processes.

At block 410, if the first node determines that both [A] and [B] detect the same object or the same condition (or both), then the first node transmits an output [x] that includes one of [A] and [B] with the identified object data or the identified condition (or both) for further processing by the ECU (block 411). The process continues at A1 in FIG. 5a. On the other hand, if [A] and [B] do not validate each other as they are different (e.g. do not detect the same object or the same condition, or both), then an output [x'], which includes both [A] and [B], along with the analysis from the first node, is transmitted to the ECU (block 412). Block 412 leads to B1.

In another example aspect, [x] includes a pointer to [A] or [B], and [N1-analysis] if the object or the condition (or both) are locally validated by the first node. Conversely, [x'] includes pointers to both [A] [B], and [N1-analysis] if the object or condition(or both) is not locally validated by the first node.

A similar process is excited at the second node. After block 406, block 413 is executed by the processor module 216. The second node executes analysis of received [A] with [B] in relation to the time stamp of [A]. The processing of this data, for example, results in an analysis score which defines in whole, or in part, the data [N2-analysis]. For example, this score is used to indicate a particular situation.

In an example aspect, the analysis at the second node includes determine whether or not [B] and [A], for the same time period validate each other. Furthermore, the analysis may include identifying an object or a condition (or both) in [A] and in [B], determining whether the object or the condition (or both) is the same, and if so, outputting a validation of the identified object or the identified condition (or both). The analysis also includes, in another example aspect, identifying attributes of the object or the condition (or both), for example, using pattern recognition processes.

At block 414, if the second node determines that both [A] and [B] detect the same object or the same condition (or both), then the second node transmits an output [y] that includes one of [A] and [B] with the identified object data or the identified condition data (or both) for further processing by the ECU (block 416). The process continues at A2 in FIG. 5a. On the other hand, if [A] and [B] do not validate each other as they are different (e.g. do not detect the same object or same condition, or both), then an output [y'], which includes both [A] and [B], along with the analysis from the first node, is transmitted to the ECU (block 415). Block 415 leads to B2.

In another example aspect, [y] includes a pointer to [A] or [B], and [N2-analysis] if the object or condition (or both) is locally validated by the second node. In another example aspect, [y'] includes pointers to both [A] [B], and [N2-analysis], if the object or condition (or both) is not locally validated by the second node.

Figure 5A:
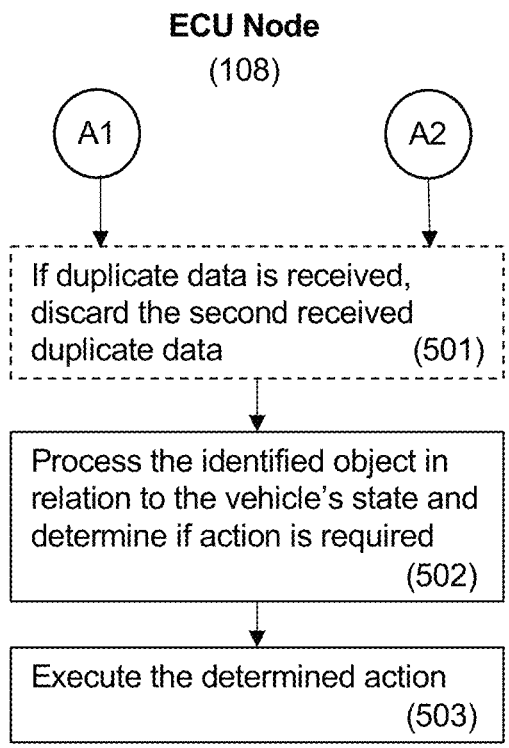
FIGS. 5a and 5b are flow diagrams of processor executable instructions for an Electronic Control Unit (ECU) to process the data sensor data, according to an example embodiment.

Turning to FIG. 5a, blocks A1 and A2 lead to the ECU node 108 receiving [x] or [y] or both. In particular, if duplicate data is received at the ECU node, then the second received duplicate data is discarded (block 501). The ECU 219 processes the received data in relation to the mobile platform's current state and control parameters and determines if action is required (block 502). If action is required, then ECU 219 executes or initiates the execution of the action (block 503), such as transmitting an action command to control one or more subsystems of the mobile platform.

Figure 5B:
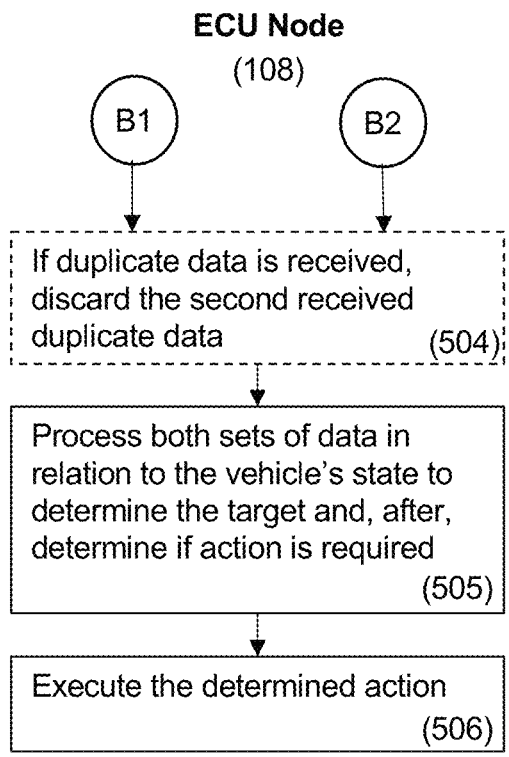

Turning to FIG. 5b, blocks B1 and B2 lead to the ECU node 108 receiving [x'] or [y'] or both. In particular, if duplicate data is received at the ECU node, then the second received duplicate data is discarded (block 504). The ECU 219 processes data sets from both sensors S1 and S2 in relation to the mobile platform's current state to determine the target and, after, determines if action is required (block 505). If action is required, then ECU 219 executes or initiates the execution of the action (block 506), such as transmitting an action command to control one or more subsystems of the mobile platform.

Figure 6:
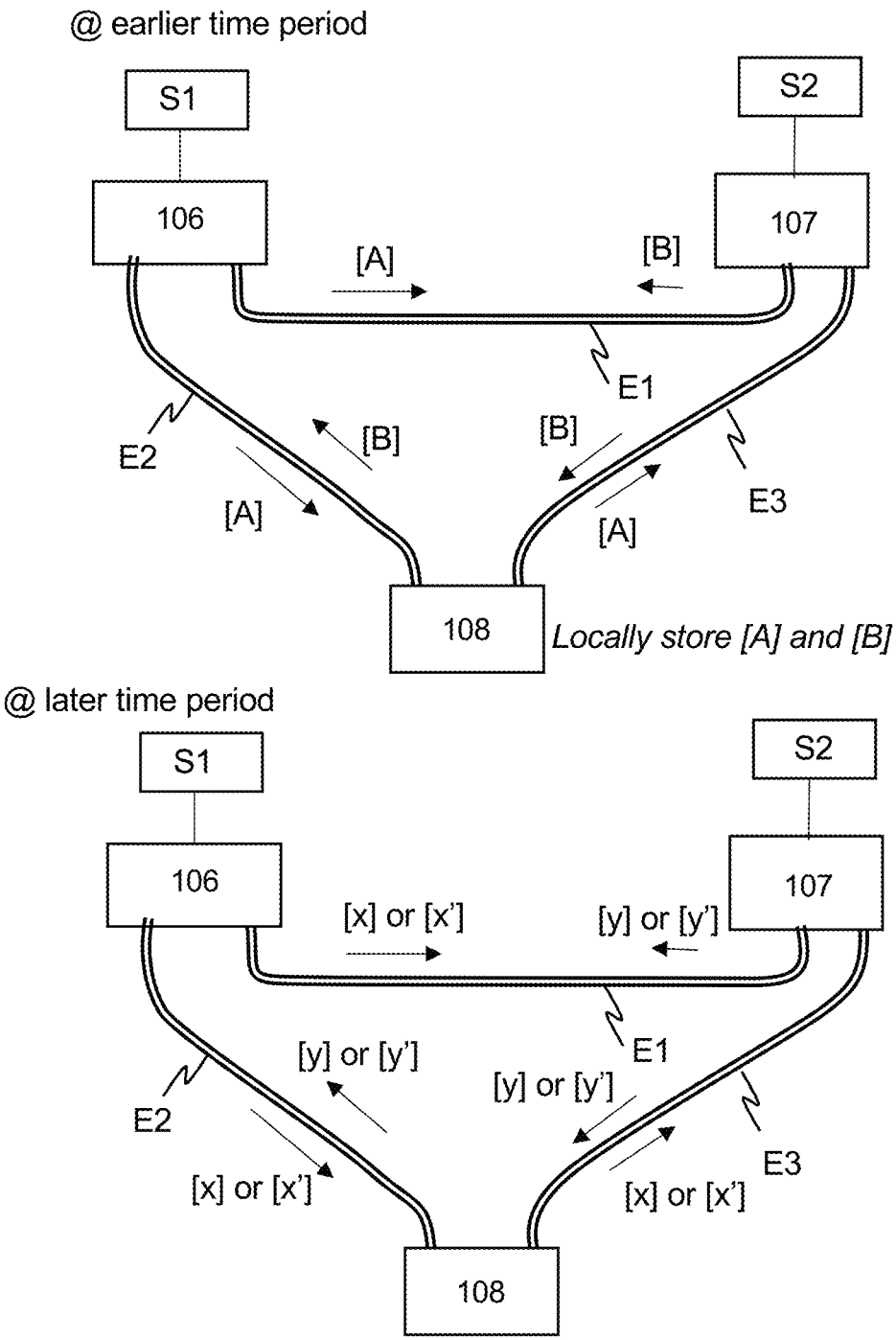
FIG. 6 is a schematic diagram of the RENASP system shown in FIG. 2, and further showing the flow of data, according to an example embodiment.

Turning to FIG. 6, an example embodiment shows the data flow when all the Ethernet cables are in a nominal condition. At an earlier time period, one copy of [A] travels from the first node to the second node along E1, while another copy of [A] travels along E2 and E3 to reach the second node. When the second copy of [A] passes through the ECU node 108, in an example embodiment, the ECU node locally stores [A] for immediate processing or future processing, or both. Conversely, copies of [B] also travel through the Ethernet network and are processed in a similar way as [A].

At a later time period, the comparison data output from each node (e.g. [x] or [x'], and [y] or [y']) are also transmitted throughout the Ethernet network in a redundant manner. In an example embodiment, the output [x] does not include a full copy of [A] or [B], but instead includes a pointer to [A] or [B] as the full copy is already stored on the ECU node 108. Similarly, output [x'] does not include full copies of [A] and [B], but instead includes pointers to [A] and [B] as the full copies are already stored on the ECU node 108. For example, the first node transmits a copy of [x] or [x'] to the ECU node 108 via E2, as well as transmits another copy of [x] or [x'] via E1 and E3.

Figure 7:
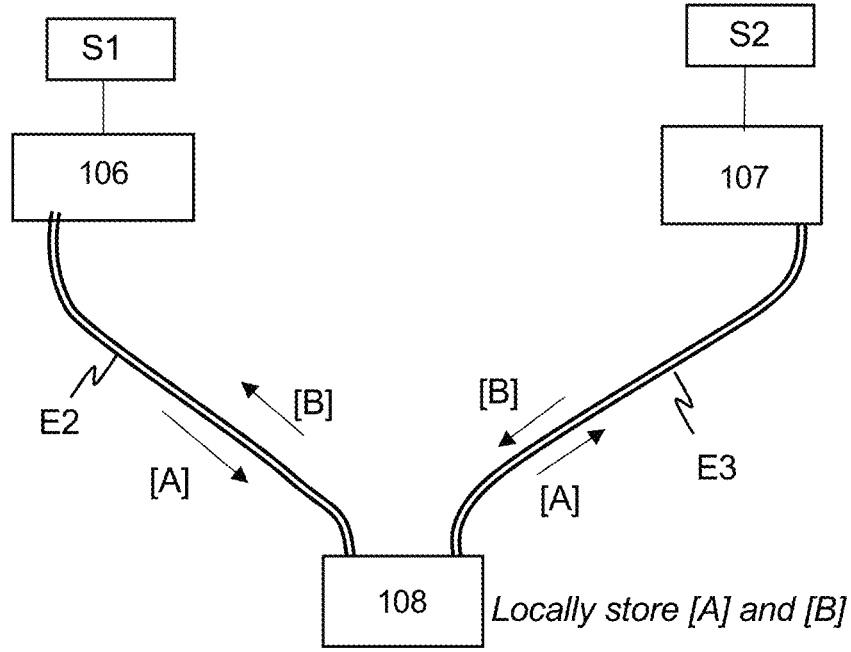
FIG. 7 is a schematic diagram of the RENASP system shown in FIG. 2, and further showing the flow of data during a failure of data transmission across a first Ethernet cable, according to an example embodiment.
Figure 7:
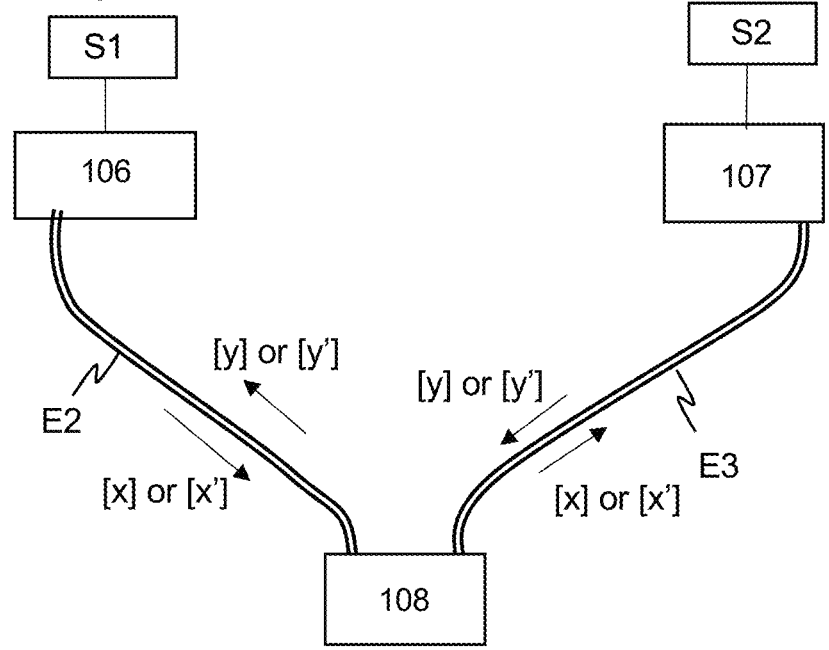

FIG. 7 shows an example embodiment of the data flow when the first Ethernet cable E1 is damaged or compromised. Data flows through the ECU node 108 to maintain data connectivity. For example, data from the second node 107 flows along E3, through the ECU node 108, and along E2 to reach the first node 106. The processing functionality is maintained.

Figure 8:
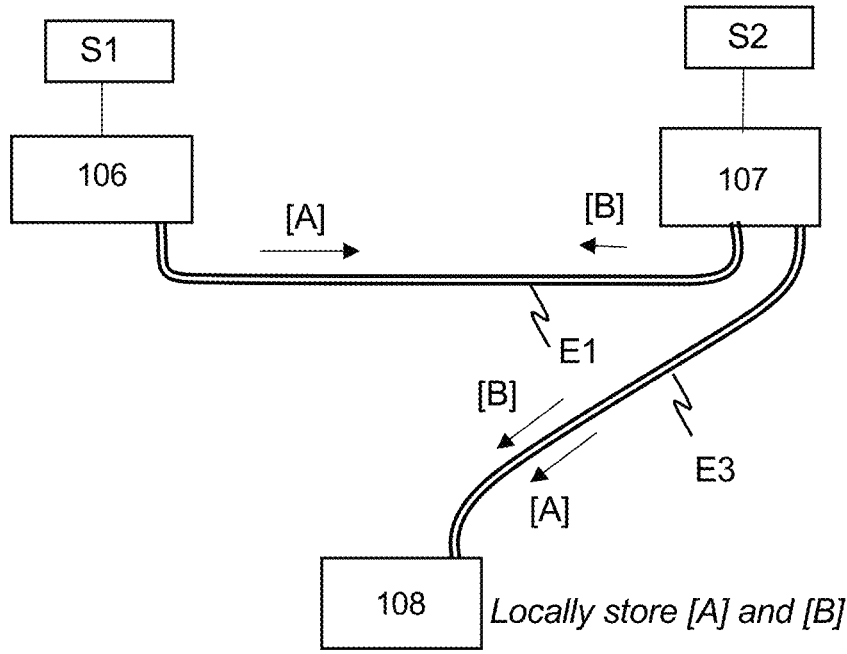
FIG. 8 is a schematic diagram of the RENASP system shown in FIG. 2, and further showing the flow of data during a failure of data transmission across a second Ethernet cable, according to an example embodiment.
Figure 8:
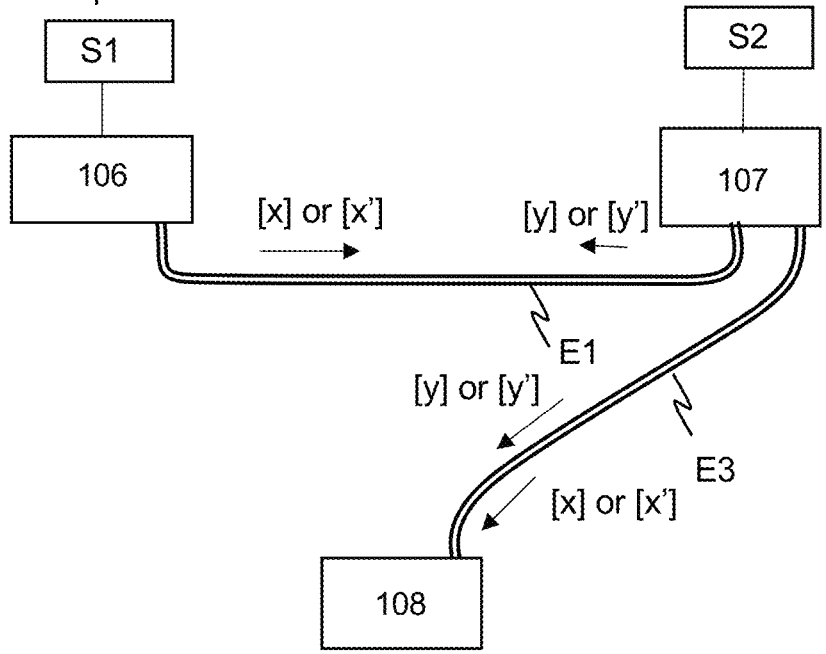

FIG. 8 shows an example embodiment of the data flow when the second Ethernet cable is damaged or compromised. Data flows through the second node 107 to maintain data connectivity. For example, data from the first node 106 flows along E1, through the second node 107, and along E3 to reach the ECU node 108. The processing functionality is maintained.

Figure 9:
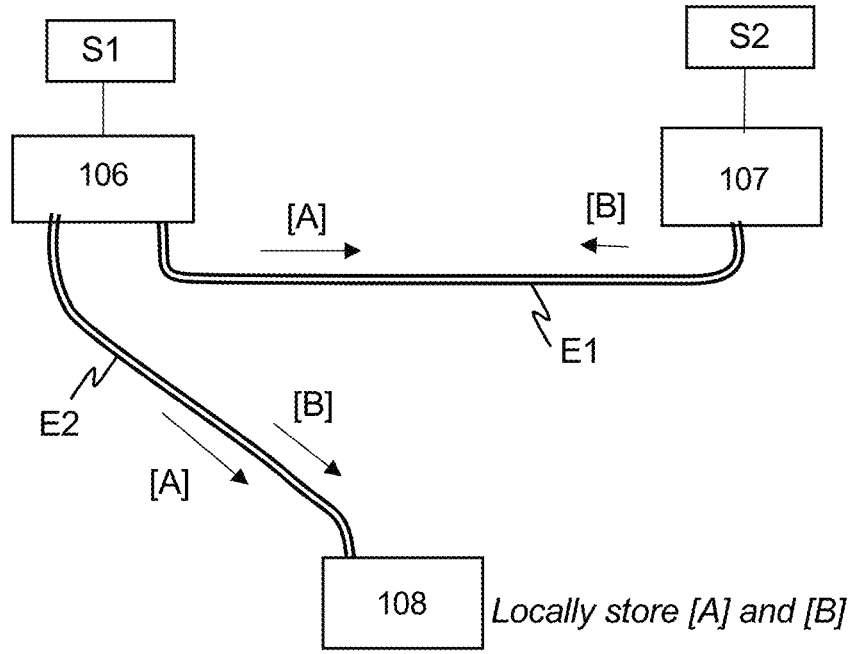
FIG. 9 is a schematic diagram of the RENASP system shown in FIG. 2, and further showing the flow of data during a failure of data transmission across a third Ethernet cable, according to an example embodiment.
Figure 9:
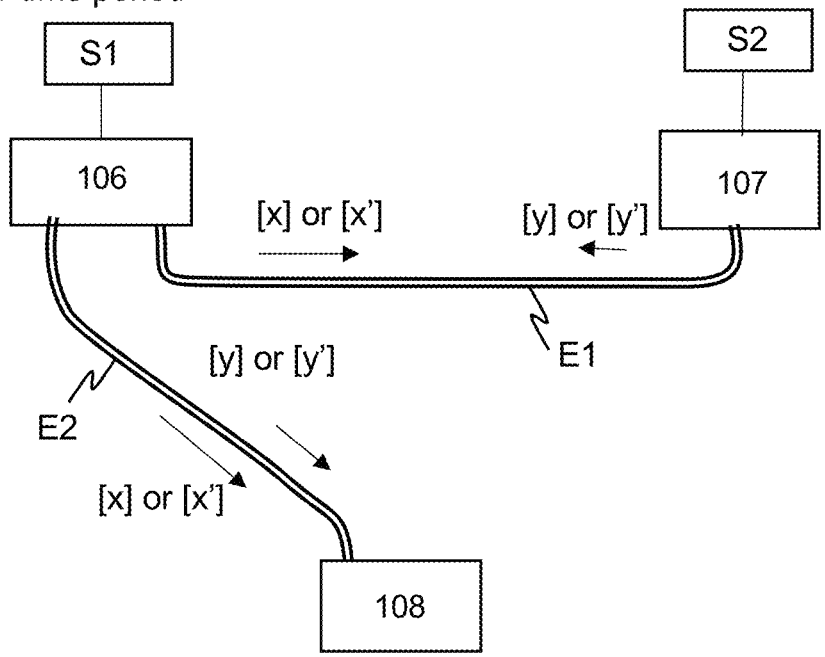

FIG. 9 shows an example embodiment of the data flow when the third Ethernet cable is damaged or compromised. Data flows through the first node 106 to maintain data connectivity. For example, data from the second node 107 flows along E1, through the first node 106, and along E2 to reach the ECU node 108. The processing functionality is maintained.

Figure 10:
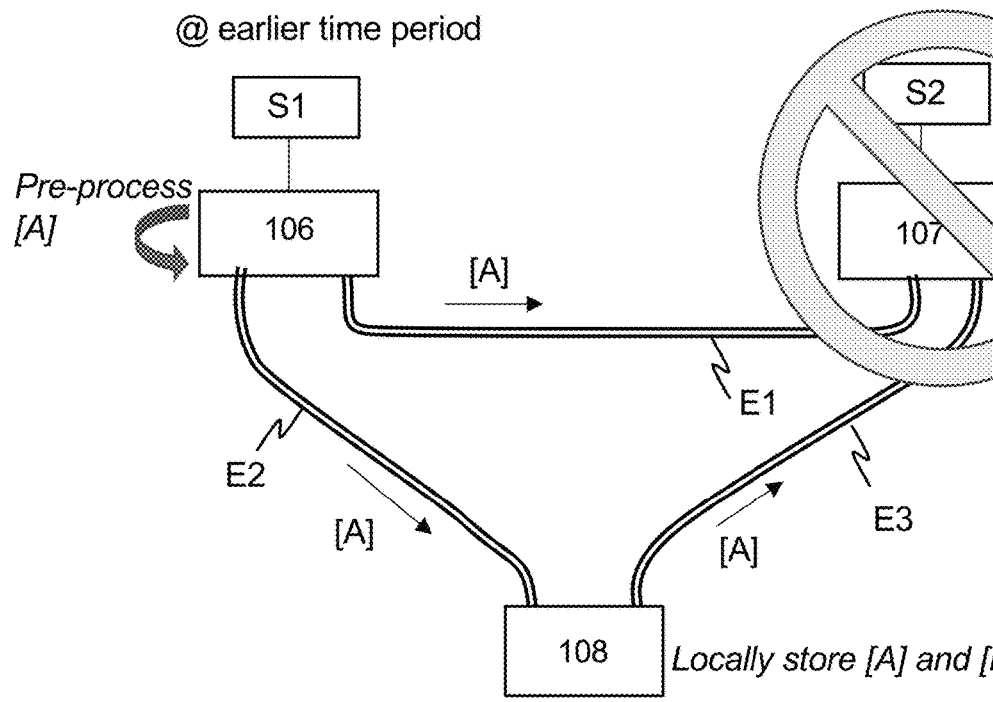
FIG. 10 is a schematic diagram of the RENASP system shown in FIG. 2, after further showing the flow of data during a failure or damage to one of the nodes, according to an example embodiment.
Figure 10:
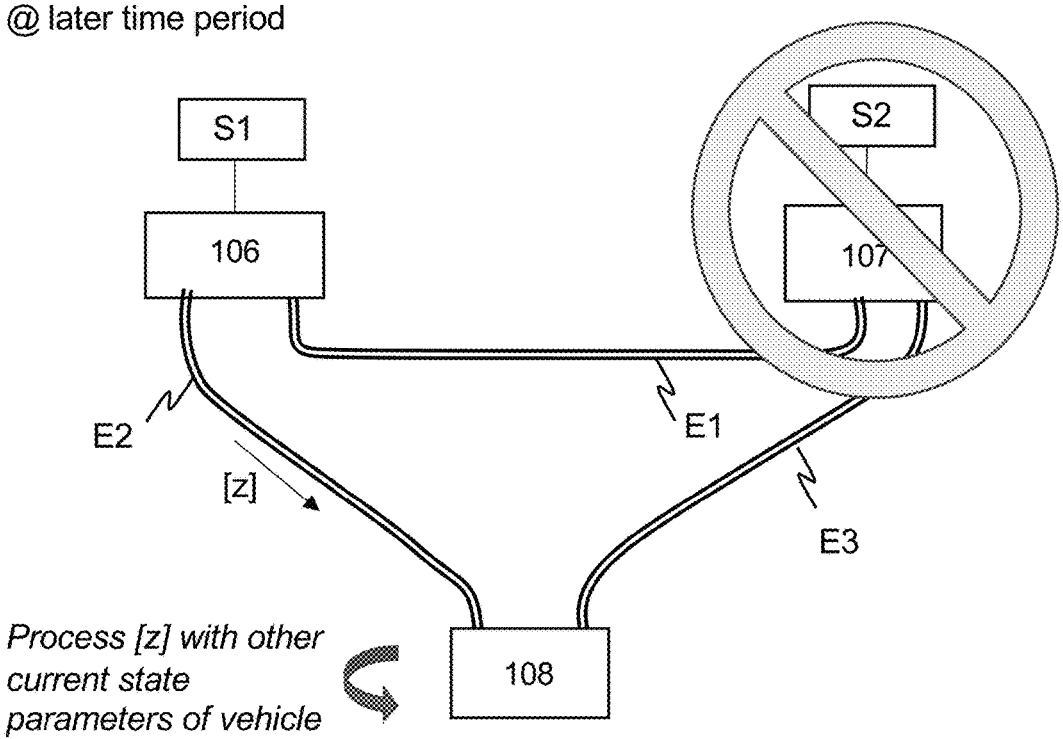

FIG. 10 shows an example embodiment when the second node is compromised (e.g. due to mechanical, electrical or software failure, or a combination thereof). In other words, data from the sensor S2 is neither processed nor transmitted. In an example embodiment, the RENASP system is still able to function as the second node is a redundant node to the first node. At an earlier time period, the first node pre-processes the data [A], such as to identify attributes of one or more objects detected by the sensor S1; this analysis of the data [A] is herein called [z]. At a later time period, the data [z] is sent to the ECU node, and the ECU node processes [z] in combination with other current state parameters of the vehicle, in order to output one or more action commands to control one or more subsystems of the vehicle.

In an example aspect of each of FIGS. 7, 8, 9 and 10, there is no data packet loss when the failure occurs. In another example aspect of each of FIGS. 7, 8, 9 and 10, there is no delay (e.g. zero second delay) when the failure occurs.

Figure 11:
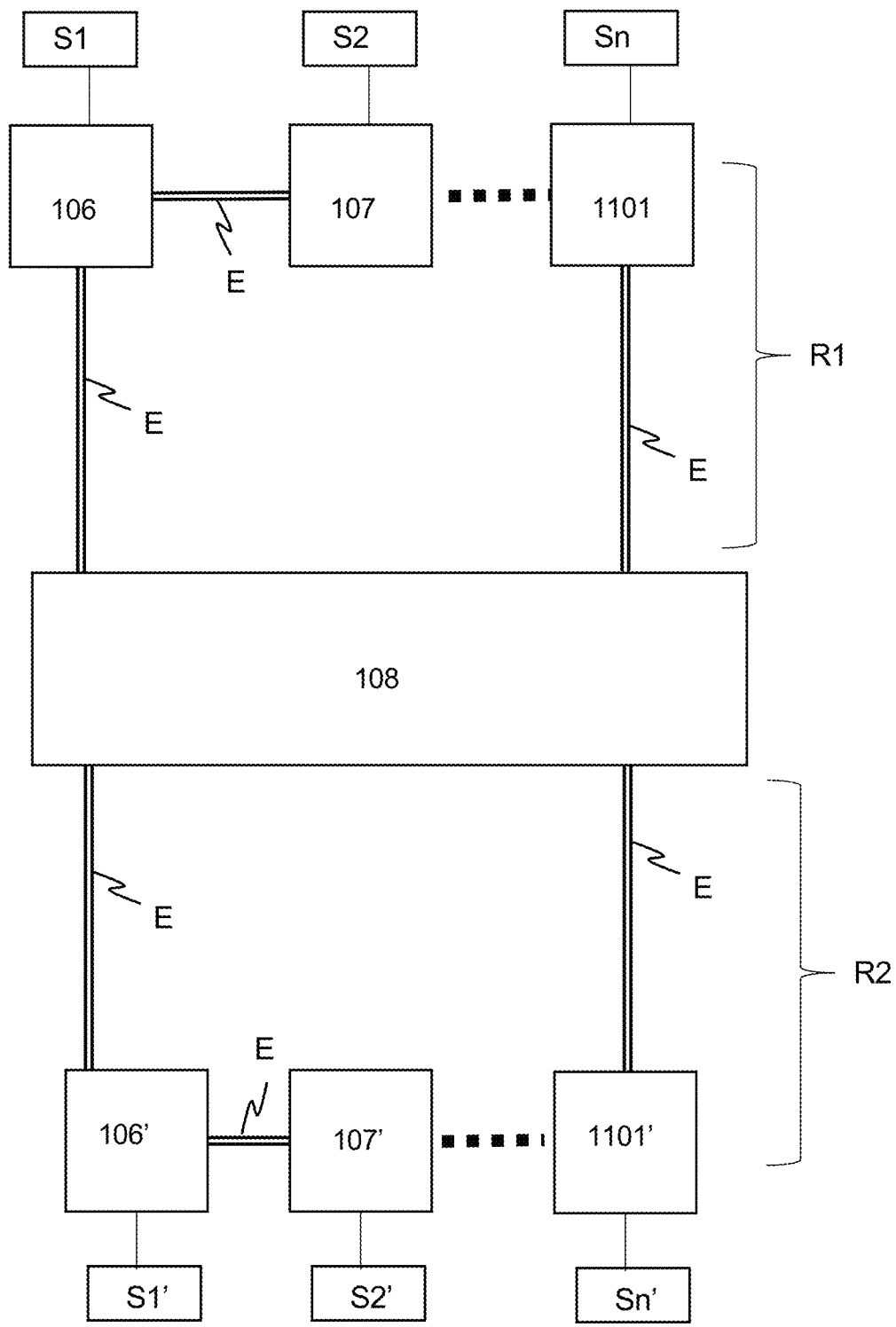
FIG. 11 is a schematic diagram of a RENASP system that includes multiple rings of sensor nodes in data communication with an ECU node.

FIG. 11 shows another redundant Ethernet network that is integrated into a mobile platform. A first network ring R1 includes multiple sensors nodes 106, 107, 1101 and the ECU node 108 that are arranged in a ring configuration. Ethernet cables E connect the nodes together. The sensors nodes are each respectively in data communication with one or more sensors. For example, the sensor node 1101 is connected to a sensor system Sn that includes one or more sensors. A second network rink R2 is connected to the same ECU node 108 and includes other sensor nodes 106', 107' and 1101'. These sensor nodes are respectively in data communication with sensor systems S1', S2' and Sn'.

In an example aspect, the sensors that are part of the first ring R1 detect or measure a first area in or around the mobile platform. The sensors that are part of the second ring R2 detect or measure a second area in or around the mobile platform. For example, the first area is a right side of a vehicle, and the second area is the left side of the vehicle. In another example, the first area is a front side of a vehicle, and the second area is a rear side of the vehicle.

Below are general example embodiments and example aspects.

In a general example embodiment, a redundant Ethernet network within a mobile platform is provided, and it comprises: a first node connected to a first sensor that monitors a first area in or around the mobile platform; a second node connected to a second sensor that monitors a second area in or around the mobile platform; the first node, the second node and an ECU node connected to each other via Ethernet cables; the first node transmitting data [A] obtained by the first sensor to the second node and the ECU node, and the second node transmitting data [B] obtained by the second sensor to the first node and the ECU node; after the first node receives the data [B], the first node executing a first analysis to determine if the data [B] and the data [A] validate each other, and transmitting a first analysis result to the control node; and after the second node receives the data [A], the second node executing a second analysis to determine if the data [B] and the data [A] validate each other, and transmitting a second analysis result to the ECU node.

In an example aspect the first node comprises a first data port and a second data port connected to the redundant Ethernet network, and the first node duplicates the data [A] and transmits at a same time a first instance of the data [A] and a second instance of the data [A] respectively via the first data port and the second data port.

In an example aspect, the second node comprises a first data port and a second data port connected to the redundant Ethernet network, and the second node duplicates the data [B] and transmits at a same time a first instance of the data

[B] and a second instance of the data [B] respectively via the first data port and the second data port.

In an example aspect, each of the first node, the second node and the ECU node comprise two data ports, and the first node, the second node and the ECU node are arranged in a ring network configuration.

In an example aspect, the first area and the second area at least partially overlap.

In an example aspect, the first area and the second area are nonoverlapping.

In an example aspect, after the first node determines the data [A] and the data [B] validate each other, the first node transmits only one of the data [A] and the data [B], along with the first analysis result, to the ECU node.

In an example aspect, after the second node determines the data [A] and the data [B] validate each other, the second node transmits only one of the data [A] and the data [B], along with the second analysis result, to the ECU node.

In an example aspect, the first analysis further comprises identifying an object in the data [A] and the same object in the data [B], and then identifying attributes of the object that are transmitted in the first analysis result to the ECU node.

In an example aspect, the identifying attributes include one or more of: a boundary box around the object, an outline of the object, a size of the object, a distance between the object and the mobile platform, a color of the object, and a name of the object.

In an example aspect, the second analysis further comprises identifying an object in the data [A] and the same object in the data [B], and then identifying attributes of the object that are transmitted in the second analysis result to the ECU node.

In an example aspect, the identifying attributes include one or more of: a boundary box around the object, an outline of the object, a size of the object, a distance between the object and the mobile platform, a color of the object, and a name of the object.

In an example aspect, after a threshold number of times that the first node determines instances of data [A] and instances of data [B] invalidate each other, the first node transmitting an alert regarding a potential error in at least one of the first sensor and the second sensor.

In an example aspect, after a threshold number of times that the first node determines instances of data [A] and instances of data [B] invalidate each other, the first node transmitting an alert regarding a potential error in at least one of processing at the first node and processing at the second node.

In an example aspect, after a threshold number of times that the second node determines instances of data [A] and instances of data [B] invalidate each other, the second node transmitting an alert regarding a potential error in at least one of the first sensor and the second sensor.

In an example aspect, after a threshold number of times that the ECU node determines instances of data [A] and instances of data [B] invalidate each other, the ECU node transmitting an alert regarding a potential error in at least one of processing at the first node and processing at the second node.

In an example aspect, a first Ethernet cable is connected between the first node and the second node, a second Ethernet cable is connected between the first node and the ECU node, and a third Ethernet cable connected between the second node and the ECU node.

In an example aspect, the first node comprises a sensor interface to interact with the first sensor, a processor module comprising a processor and memory, and a redundancy module comprising two external interfacing Ethernet ports and a host Ethernet port that is connected to the processor module.

In an example aspect, the first node comprises: a sensor interface to interact with the first sensor; a processor module comprising an image processing module, a comparator module and memory; and a redundancy module comprising two external interfacing Ethernet ports and a host Ethernet port that is connected to the processor module; wherein the image processing module and the comparator module process the data [A] and the data [B] to identify an object in each of the data [A] and the data [B].

In an example aspect, the second node comprises a sensor interface to interact with the second sensor, a processor module comprising a processor and memory, and a redundancy module comprising two external interfacing Ethernet ports and a host port that is connected to the processor module.

In an example aspect, the second node comprises: a sensor interface to interact with the second sensor; a processor module comprising an image processing module, a comparator module and memory; and a redundancy module comprising two external interfacing Ethernet ports and a host Ethernet port that is connected to the processor module; wherein the image processing module and the comparator module process the data [A] and the data [B] to identify an object in each of the data [A] and the data [B].

In an example aspect, the first node is connected to a first set of sensors, the first set of sensors comprising the first sensor; and wherein the second node is connected to a second set of sensors, the second of sensors comprising the second sensor.

In an example aspect, the first set of sensors comprises a first camera and a first RADAR, and the second set of sensors comprise a second camera and a second RADAR.

In an example aspect, the first area and the second area together define an overlapping area, and wherein the first analysis further comprises identifying multiples objects in the data [A] and the same multiple objects in the data [B] in the overlapping area, and then identifying attributes of the multiple objects that are transmitted in the first analysis result to the ECU node.

In an example aspect, if all of the same multiple objects are not identified in the data [B], then the first node invalidates the data [A] and the data [B].

In an example aspect, the first area and the second area together define an overlapping area, and wherein the second analysis further comprises identifying multiples objects in the data [A] and the same multiple objects in the data [B] in the overlapping area, and then identifying attributes of the multiple objects that are transmitted in the second analysis result to the ECU node.

In an example aspect, if all of the same multiple objects are not identified in the data [B], then the second node invalidates the data [A] and the data [B].

In an example aspect, the ECU node obtains at least one of the first analysis result and the second analysis result, and the ECU node processes the at least one of the first analysis result and the second analysis result in combination with one or more current state parameters of the mobile platform to output an action command that controls one or more subsystems of the mobile platform.

In an example aspect, the one or more subsystems of the mobile platform comprise a steering subsystem, a braking subsystem, an engine subsystem, and an alert subsystem.

In an example aspect, the redundant Ethernet network further comprises intermediate nodes that transmit data between two or more of the first node, the second node and the ECU node.

In another general example embodiment, a system of sensor nodes on a mobile platform is provided, and the system comprises: a first sensor node connected to a first sensor that monitors a first area in or around the mobile platform. The first sensor node comprises: a first sensor interface to interact with the first sensor, a first processor module, and a first redundancy module comprising a first pair of external interfacing Ethernet ports and a first host port that is connected to the first processor module. The system further comprises a second sensor node connected to a second sensor that monitors a second area in or around the mobile platform, and the second sensor node comprises: a second sensor interface to interact with the second sensor, a second processor module, and a second redundancy module comprising a second pair of external interfacing Ethernet ports and a second host port that is connected to the second processor module. Furthermore, the first sensor node, the second sensor node and an electronic control unit (ECU) node are in data communication with each other over a redundant Ethernet network that utilize the first pair of external interfacing ports and the second pair of external interfacing ports.

In an example aspect, data to be transmitted by the first sensor node is duplicated and transmitted in opposite directions in the redundant Ethernet network via the first pair of external interfacing Ethernet ports at a same time.

In an example aspect, data to be transmitted by the second sensor node is duplicated and transmitted in opposite directions in the redundant Ethernet network via the second pair of external interfacing Ethernet ports at a same time.

In an example aspect, the first sensor node, the second sensor node and the ECU node are arranged in a ring network configuration.

In an example aspect, the first sensor node comprises a first image processing module, and the second sensor node comprises a second image processing module.

In an example aspect, the first image processing module is a first graphics processing unit and the second image processing module is a second graphics processing unit.

In an example aspect, the first sensor node comprises a first comparator module, and the second sensor node comprises a second comparator module.

In an example aspect, in a failure in the redundant Ethernet network, data transmitted from the first sensor node arrives at the second node and at the ECU node with zero data packet loss.

In an example aspect, in a failure in the redundant Ethernet network, data transmitted from the first sensor node arrives at the second node and at the ECU node with zero second delay.

In an example aspect, the first node is connected to a first set of sensors, the first set of sensors comprising the first sensor; and wherein the second node is connected to a second set of sensors, the second of sensors comprising the second sensor.

In an example aspect, the first set of sensors comprises a first camera and a first RADAR, and the second set of sensors comprise a second camera and a second RADAR.

In an example aspect, the first processor module compares data [A] locally obtained by the first sensor with received data [B] obtained by the second sensor to determine if the data [A] and the data [B] are validated.

In an example aspect, the second processor module compares data [B] locally obtained by the second sensor with data [A] that has been received to determine if the data [A] and the data [B] are validated.

In another general example embodiment, a mobile platform is provided and it comprises: a first sensor system connected to a first node and a second sensor system connected to a second node; and an Ethernet network connecting an electronic control unit (ECU) node, the first node and the second node in a ring network configuration. The first node transmits data [A] obtained by the first sensor system to the second node and the ECU, and the second node transmits data [B] obtained by the second sensor system to the first node and the ECU. After the first node receives the data [B], the first node executes a first analysis of the data [B] and the data [A], and transmits a first analysis result to the ECU. After the second node receives the data [A], the second node executes a second analysis of the data [B] and the data [A], and transmits a second analysis result to the ECU.

In an example aspect, the first sensor system and the second sensor system each comprise a camera and a RADAR.

In an example aspect, the first sensor system and the second sensor system each comprise multiple sensors.

In an example aspect, the first sensor system and the second sensor system each detect an environmental condition.

In an example aspect, the first node duplicates the data [A] and simultaneously transmits a first instance of the data [A] in a first direction in the ring network configuration, and a second instance of the data [A] in a second direction in the ring network configuration.

In an example aspect, the second node duplicates the data [B] and simultaneously transmits a first instance of the data [B] in a first direction in the ring network configuration, and a second instance of the data [B] in a second direction in the ring network configuration.

In another general example embodiment, a redundant Ethernet network within a vehicle, is provided. It includes: a first node connected to a first sensor that monitors a first area in or around the vehicle; and a second node connected to a second sensor that monitors a second area in or around the vehicle, wherein the first area and the second area at least partially overlap. The first node, the second node and an ECU node connected to each other via Ethernet cables. The first node transmits data [A] obtained by the first sensor to the second node and the ECU node, and the second node transmits data [B] obtained by the second sensor to the first node and the ECU node. After the first node receives the data [B], the first node executes a first analysis to determine if the data [B] and the data [A] validate each other, and transmits a first analysis result to the ECU node. After the second node receives the data [A], the second node executes a second analysis to determine if the data [B] and the data [A] validate each other, and transmits a second analysis result to the ECU node.

In an example aspect, the first node includes: a sensor interface to interact with the first sensor; a processor module including an image processing module, a comparator module and memory; and a redundancy module including two external interfacing Ethernet ports and a host Ethernet port that is connected to the processor module; wherein the image processing module and the comparator module process the data [A] and the data [B] to identify an object in each of the data [A] and the data [B]. In an example aspect, the image processor module and the comparator module are respectively a GPU and a CPU. In another example aspect, the image processor module and the comparator module are integrated into one physical processing chip.

In an example aspect, the second node includes: a sensor interface to interact with the second sensor; a processor module including an image processing module, a comparator module and memory; and a redundancy module including two external interfacing Ethernet ports and a host Ethernet port that is connected to the processor module; wherein the image processing module and the comparator module process the data [A] and the data [B] to identify an object in each of the data [A] and the data [B]. In an example aspect, the image processor module and the comparator module are respectively a GPU and a CPU. In another example aspect, the image processor module and the comparator module are integrated into one physical processing chip.

In another general example embodiment, a car is provided that includes: a first camera connected to a first node and a second camera connected to a second node; a first Ethernet cable connected between the first node and the second node, a second Ethernet cable connected between the first node and an ECU, and a third Ethernet cable connected between the second node and the ECU; the first node transmitting data [A] obtained by the first camera to the second node and the ECU, and the second node transmitting data [B] obtained by the second camera to the first node and the ECU; after the first node receives the data [B], the first node executing a first analysis of the data [B] and the data [A], and transmitting a first analysis result to the ECU via the second Ethernet cable; and after the second node receives the data [A], the second node executing a second analysis of the data [B] and the data [A], and transmitting a second analysis result to the ECU via the third Ethernet cable.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, optical storage, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A redundant data network within a mobile platform, comprising:
   a first node connected to a first sensor that monitors a first area in or around the mobile platform;
   a second node connected to a second sensor that monitors a second area in or around the mobile platform;
   the first node, the second node and an ECU node connected to each other via data cables;
   the first node configured to transmit data [A] obtained by the first sensor to the second node and the ECU node, and the second node configured to transmit data [B] obtained by the second sensor to the first node and the ECU node;
   after the first node receives the data [B], the first node further configured to execute a first analysis to determine if the data [B] and the data [A] validate each other, and to transmit a first analysis result to the ECU node;
   after the second node receives the data [A], the second node configured to execute a second analysis to determine if the data [B] and the data [A] validate each other, and to transmit a second analysis result to the ECU node; and
   wherein at least one of the first analysis and the second analysis further comprises identifying an object in the data [A] and the same object in the data [B], and then identifying one or more attributes of the object, which is transmitted to the ECU node as part of at least one of the first analysis result and the second analysis result.

2. The redundant data network of claim 1 wherein the first node comprises a first data port and a second data port connected to the redundant data network, and the first node duplicates the data [A] and transmits at a same time a first instance of the data [A] and a second instance of the data [A] respectively via the first data port and the second data port.

3. The redundant data network of claim 1 wherein the second node comprises a first data port and a second data port connected to the redundant data network, and the second node duplicates the data [B] and transmits at a same time a first instance of the data [B] and a second instance of the data [B] respectively via the first data port and the second data port.

4. The redundant data network of claim 1 wherein each of the first node, the second node and the ECU node comprise two data ports, and the first node, the second node and the ECU node are arranged in a ring network configuration.

5. The redundant data network of claim 1 wherein the first area and the second area at least partially overlap.

6. The redundant data network of claim 1 wherein the first area and the second area are nonoverlapping.

7. The redundant data network of claim 1 wherein, after the first node determines the data [A] and the data [B]

validate each other, transmitting only one of the data [A] and the data [B], along with the first analysis result, to the ECU node.

8. The redundant data network of claim 1 wherein, after the second node determines the data [A] and the data [B] validate each other, transmitting only one of the data [A] and the data [B], along with the second analysis result, to the ECU node.

9. The redundant data network of claim 1 wherein the one or more attributes comprise one or more of: a boundary box around the object, an outline of the object, a size of the object, a distance between the object and the mobile platform, a color of the object, and a name of the object.

10. The redundant data network of claim 1 wherein, after a threshold number of times that the first node determines instances of data [A] and instances of data [B] invalidate each other, the first node transmitting an alert regarding a potential error in at least one of the first sensor and the second sensor.

11. The redundant data network of claim 1 wherein, after a threshold number of times that the first node determines instances of data [A] and instances of data [B] invalidate each other, the first node transmitting an alert regarding a potential error in at least one of processing at the first node and processing at the second node.

12. The redundant data network of claim 1 wherein, after a threshold number of times that the second node determines instances of data [A] and instances of data [B] invalidate each other, the second node transmitting an alert regarding a potential error in at least one of the first sensor and the second sensor.

13. The redundant data network of claim 1 wherein, after a threshold number of times that the ECU node determines instances of data [A] and instances of data [B] invalidate each other, the ECU node transmitting an alert regarding a potential error in at least one of processing at the first node and processing at the second node.

14. The redundant data network of claim 1 wherein the data cables comprise Ethernet cables, and a first Ethernet cable is connected between the first node and the second node, a second Ethernet cable is connected between the first node and the ECU node, and a third Ethernet cable connected between the second node and the ECU node.

15. The redundant data network of claim 1, which is an Ethernet network, wherein the first node comprises a sensor interface to interact with the first sensor, a processor module comprising a processor and memory, and a redundancy module comprising two external interfacing Ethernet ports and a host Ethernet port that is connected to the processor module.

16. The redundant data network of claim 1, which is an Ethernet network, wherein the first node comprises: a sensor interface to interact with the first sensor; a processor module comprising an image processing module, a comparator module and memory; and a redundancy module comprising two external interfacing Ethernet ports and a host Ethernet port that is connected to the processor module; wherein the image processing module and the comparator module process the data [A] and the data [B] to identify an object in each of the data [A] and the data [B].

17. The redundant data network of claim 1, which is an Ethernet network, wherein the second node comprises a sensor interface to interact with the second sensor, a processor module comprising a processor and memory, and a redundancy module comprising two external interfacing Ethernet ports and a host port that is connected to the processor module.

18. The redundant data network of claim 1, which is an Ethernet network, wherein the second node comprises: a sensor interface to interact with the second sensor; a processor module comprising an image processing module, a comparator module and memory; and a redundancy module comprising two external interfacing Ethernet ports and a host Ethernet port that is connected to the processor module; wherein the image processing module and the comparator module process the data [A] and the data [B] to identify an object in each of the data [A] and the data [B].

19. The redundant data network of claim 1 wherein the first node is connected to a first set of sensors, the first set of sensors comprising the first sensor; and wherein the second node is connected to a second set of sensors, the second set of sensors comprising the second sensor.

20. The redundant data network of claim 19 wherein the first set of sensors comprises a first camera and a first RADAR, and the second set of sensors comprise a second camera and a second RADAR.

21. The redundant data network of claim 1 wherein the first area and the second area together define an overlapping area, and wherein the first analysis further comprises identifying a plurality of objects in the data [A] and the same plurality of objects in the data [B] in the overlapping area.

22. The redundant data network of claim 21 wherein if all of the same plurality of objects are not identified in the data [B], then the first node invalidates the data [A] and the data [B].

23. The redundant data network of claim 1 wherein the first area and the second area together define an overlapping area, and wherein the second analysis further comprises identifying a plurality of objects in the data [A] and the same plurality of objects in the data [B] in the overlapping area.

24. The redundant data network of claim 23 wherein if all of the same plurality of objects are not identified in the data [B], then the second node invalidates the data [A] and the data [B].

25. The redundant data network of claim 1 wherein the ECU node obtains at least one of the first analysis result and the second analysis result, and the ECU node processes the at least one of the first analysis result and the second analysis result in combination with one or more current state parameters of the mobile platform to output an action command that controls one or more subsystems of the mobile platform.

26. The redundant data network of claim 25 wherein the one or more subsystems of the mobile platform comprise a steering subsystem, a braking subsystem, a motor subsystem, and an alert subsystem.

27. The redundant data network of claim 1 further comprising one or more intermediate nodes that transmit data between two or more of the first node, the second node and the ECU node.

28. A mobile platform comprising:
a first sensor system connected to a first node and a second sensor system connected to a second node;
a data network connecting an electronic control unit (ECU) node, the first node and the second node in a ring network configuration;
the first node configured to transmit data [A] obtained by the first sensor system to the second node and the ECU, and the second node configured to transmit data [B] obtained by the second sensor system to the first node and the ECU;
after the first node receives the data [B], the first node configured to execute a first analysis of the data [B] and the data [A], and to transmit a first analysis result to the ECU;

after the second node receives the data [A], the second node configured to execute a second analysis of the data [B] and the data [A], and to transmit a second analysis result to the ECU; and wherein at least one of the first analysis and the second analysis further comprises identifying an object in the data [A] and the same object in the data [B], and then identifying one or more attributes of the object, which is transmitted to the ECU node as part of at least one of the first analysis result and the second analysis result.

29. The mobile platform of claim 28 wherein the first sensor system and the second sensor system each comprise a camera and a RADAR.

30. The mobile platform of claim 28 wherein the one or more attributes comprise one or more of: a boundary box around the object, an outline of the object, a size of the object, a distance between the object and the mobile platform, a color of the object, and a name of the object.

31. The mobile platform of claim 28 wherein the first sensor system senses a first area around the mobile platform and the second sensor system senses a second area around the mobile platform, and the first area and the second area at least partially overlap and define an overlapping area.

32. The mobile platform of claim 31 wherein at least one of the first analysis and the second analysis further comprises identifying a plurality of objects in the data [A] and the same plurality of objects in the data [B] in the overlapping area.

33. The mobile platform of claim 28 wherein, after at least one of the first node and the second node determines the data [A] and the data [B] validate each other, the at least one of the first node and the second node is or are configured to transmit only one of the data [A] and the data [B] to the ECU node.

34. A redundant data network within a mobile platform, comprising:
 a first node connected to a first sensor that monitors a first area in or around the mobile platform;
 a second node connected to a second sensor that monitors a second area in or around the mobile platform;
 the first node, the second node and an ECU node connected to each other via Ethernet cables;
 the first node configured to transmit data [A] obtained by the first sensor to the second node and the ECU node, and the second node configured to transmit data [B] obtained by the second sensor to the first node and the ECU node;
 after the first node receives the data [B], the first node configured to execute a first analysis to determine if the data [B] and the data [A] validate each other, and to transmit a first analysis result to the ECU node;
 after the second node receives the data [A], the second node configured to execute a second analysis to determine if the data [B] and the data [A] validate each other, and to transmit a second analysis result to the ECU node; and
 wherein, after at least one of the first node and the second node determines the data [A] and the data [B] validate each other, the at least one of the first node and the second node is or are configured to transmit only one of the data [A] and the data [B] to the ECU node.

35. The redundant data network of claim 34 wherein at least one of the first analysis and the second analysis comprises identifying an object in the data [A] and the same object in the data [B].

36. The redundant data network of claim 35 wherein the at least one of the first analysis and the second analysis further comprises identifying one or more attributes of the object, and the one or more attributes comprise one or more of: a boundary box around the object, an outline of the object, a size of the object, a distance between the object and the mobile platform, a color of the object, and a name of the object.

* * * * *